(No Model.) 3 Sheets—Sheet 2.
P. T. KISSANE.
Traction Engine.
No. 236,041. Patented Dec. 28, 1880.
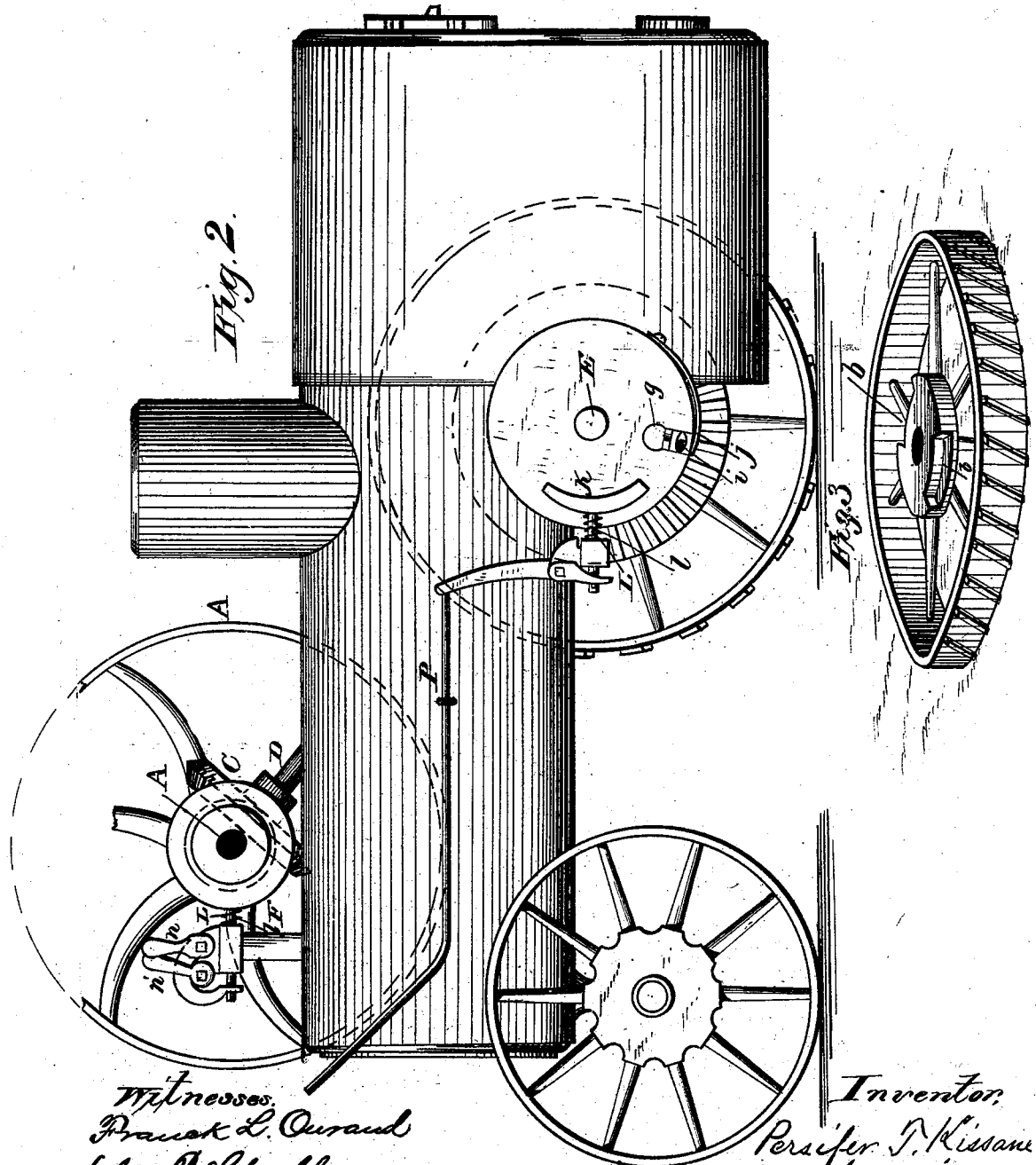

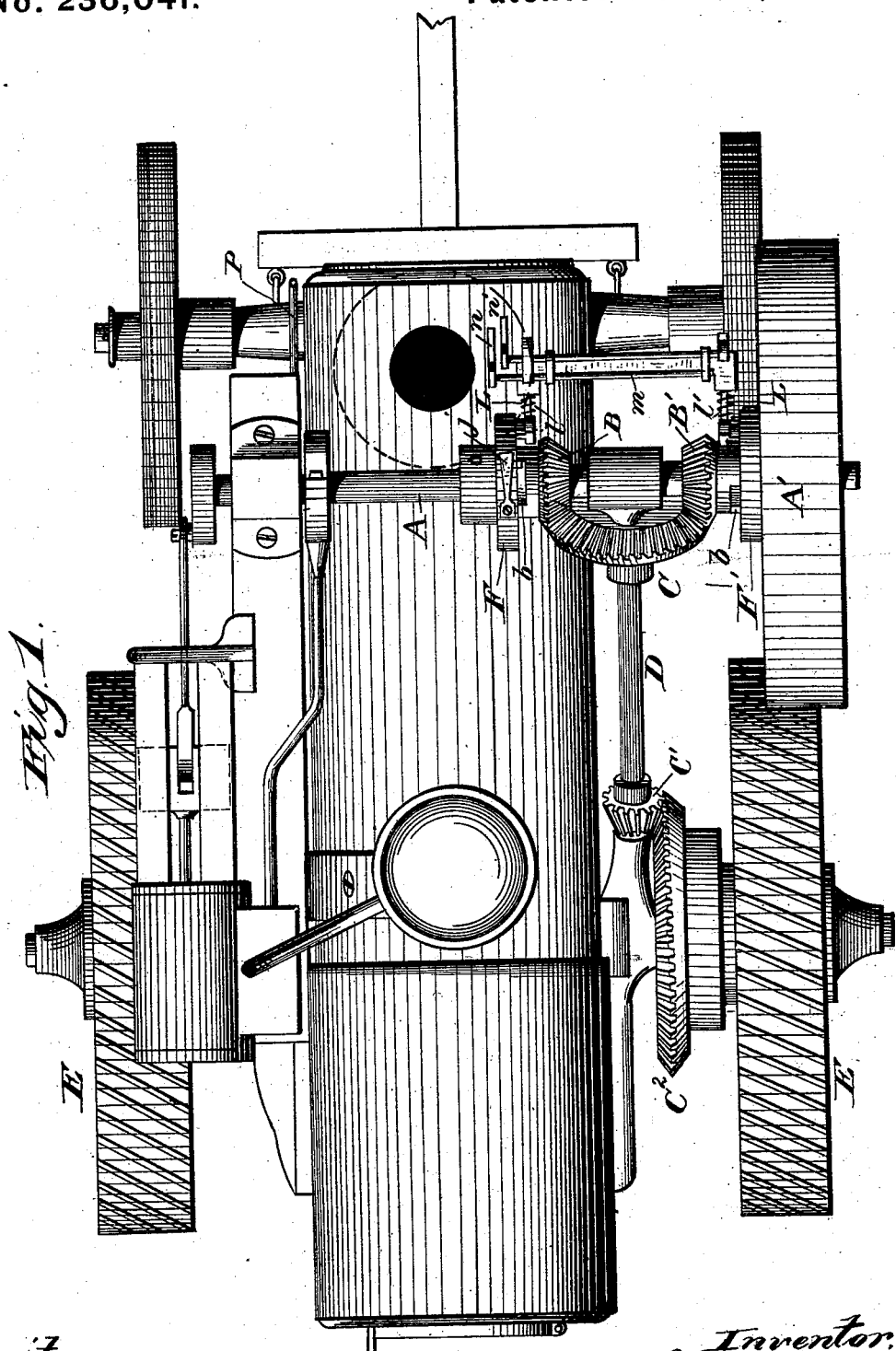

(No Model.)   P. T. KISSANE.   3 Sheets—Sheet 3.
Traction Engine.
No. 236,041.   Patented Dec. 28, 1880.
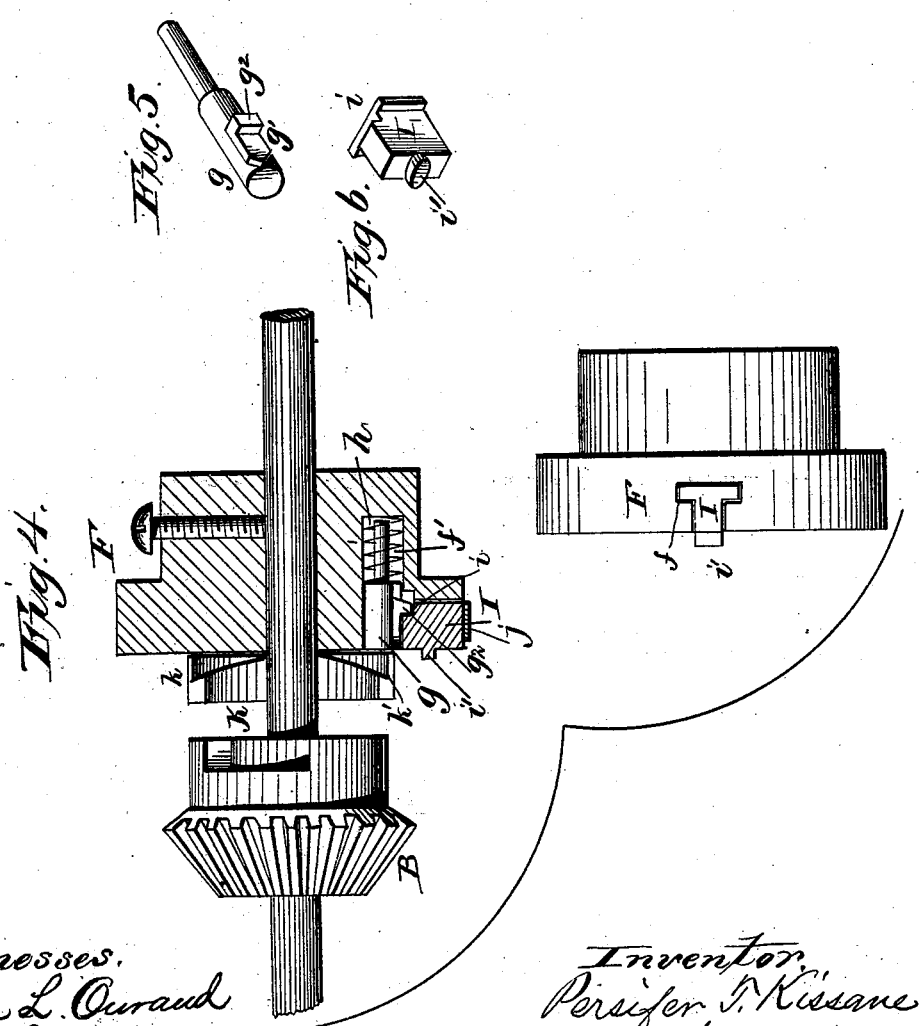

UNITED STATES PATENT OFFICE.

PERSIFER T. KISSANE, OF MANSFIELD, OHIO, ASSIGNOR TO THE AULTMAN & TAYLOR COMPANY, OF SAME PLACE.

TRACTION-ENGINE.

SPECIFICATION forming part of Letters Patent No. 236,041, dated December 28, 1880.

Application filed October 30, 1880. (No model.)

*To all whom it may concern:*

Be it known that I, PERSIFER T. KISSANE, of Mansfield, county of Richland, State of Ohio, have invented certain new and useful Improvements in Traction-Engines, of which the following is a full, clear, and exact description, reference being had to the accompanying drawings, making part of this specification, in which—

Figure 1 is a plan or top view of a traction-engine with my improvements applied. Fig. 2 is a side elevation of the same. Fig. 3 is a perspective view of one of the traction-wheels, showing the recessed disk or hub on its inner side; and Figs. 4, 5, and 6 are detail views of the clutch mechanism for throwing the machine into or out of gear or reversing the direction of movement of the machine.

The invention relates to the means for propelling the traction-engine forward or backward, and for throwing the pawls into or out of engagement with the engine-shaft and main drive-wheel axle or traction-wheels; and it consists in the combination, with the driving-gear and traction-wheels, of a novel arrangement of pawls and of cams for actuating the same placed under the control of the driver in his seat on the machine, whereby the engine or machine can be propelled in either direction without changing the direction of rotation of the engine-shaft, and whereby, also, the traction-wheels can, either or both, be connected with or disconnected from the main axle, so as either to be driven thereby or to rotate loosely thereon, as may be desired, all as hereinafter described.

The traction-engine represented in the accompanying drawings is similar in its organization or general arrangement of parts to some now in public use, and it need not, therefore, be described in detail further than is necessary to explain the present improvement.

A represents the main engine-shaft, carrying upon one end the band-wheel A', through which power is imparted for driving agricultural or other machinery. Upon this shaft two bevel-wheels, B B', are mounted, turning loosely thereon, facing each other, and both engaging or in mesh with an intermediate bevel-wheel, C, keyed to the upper forward end of an inclined shaft, D, which, at its lower end, is provided with a bevel-pinion, C', engaging with and driving a bevel-wheel, C², secured to and driving the main or traction wheel axle E.

The bevel-wheels B B' are provided on their rear or outer faces with disks or hubs having one or more notches or recesses, b, cut in their outer faces, as shown, and on the shaft A adjacent to these faces are secured pawl-carrier disks or collars F F', also notched or grooved on their inner faces for the reception of spring-pawls and retaining slides or latches, as follows: The grooves $f$ (see section of the hub or collar, Fig. 4,) extend in radial lines from the periphery of the hub inward in T or dovetail form, and terminate in cylindrical sockets $f'$, in which are arranged sliding pawls $g$, having springs $h$ arranged behind them at the inner ends of the sockets, for forcing the pawls $g$ outward. The upper face of the pawl is feathered or shouldered at $g'$, to prevent its rotation in the socket, and the inner end of this feather or shoulder has a spur, $g^2$, formed upon it, (see Figs. 4 and 5,) adapting the pawl to be held in against the tension or pressure of the spring $h$.

I is a sliding latch made in dovetail or T shape, conforming to the shape of the radial grooves $f$, in which they move, and in which they are held, forced downward or inward against the pawl $g$ by means of a spring, $j$, resting upon their outer ends, as shown. The latch I has a rabbet or shoulder formed upon its inner end at $i$, adapting it to engage with the stop $g^2$ when the pawl $g$ is forced inward, as shown in Fig. 4, for holding said pawl out of engagement with the notched hub of the wheel in connection with which it works. For forcing the pawl inward out of engagement with the wheel which it drives, and also for releasing it from its retaining-latch and permitting it to engage said wheel, I employ a cam-block, K, segmental in form and arranged in close proximity with the periphery of the hub of the wheel operated upon. The inner face of this block or shoe is provided with a double incline (see Fig. 4) facing the collar or pawl-carrier in connection with which it works. Thus, taking the pawl-carrier F, for example, as illustrated in Fig. 4, it will be seen that the block or shoe K has rabbets formed on its inner face adjacent to said wheels, extending from its ends to near the center, giving it two reversed inclines, $k\ k'$—one, $k$, approaching the pawl-carrier from the forward end of the block or shoe, and the other, $k'$, receding therefrom. By this arrangement of the forward incline, $k$, it will be seen that as the end of the pawl $g$ moves over the same the pawl will be forced inward until it is caught and held by the spring-latch I, and thus held out of engagement with the bevel-wheel B.

The cam-block or shoe K is attached to a sliding rod, L, moving in suitable guideways supported on the engine or boiler, and a spring, $l$, surrounding said rod, or otherwise suitably arranged for the purpose, serves, by its tension, to force the shoe or cam-block K inward into close proximity with the recessed hub of wheel B, into position to act on the pawls of the pawl-carrier F. The outer end of the sliding rod L is connected to a crank-arm on a rock-shaft, $m$, provided at a point within convenient reach of the driver in his seat on the machine with a lever, $n$, by means of which the tension of the spring $l$ can be overcome and the cam-block drawn outward. The outer face of said block has a cam-shaped or eccentric ledge or flange formed upon it, overhanging the inclines $k\ k'$, and resting in close proximity with the pawl-carrier F, and underneath a spur or lip, $i'$, formed upon the latch I near its outer end, as shown. By this arrangement of the eccentric flange on the cam-block, when said block is drawn out the spur or lip passes over its forward edge; but as said flange or outer face of the block recedes from the hub of the wheel the spur $i'$, and with it the latch I, is drawn outward until it releases the pawl $g$, when the latter is forced outward and enters the notch or recess $b$ in the hub of the wheel B, engaging the latter with the engine-shaft, and through said wheel imparting a forward movement to the traction-wheels. For reversing the movement of the wheels the lever $n$ is released, when the spring $l$ forces the slide-rod L, and with it the block K, inward, and the incline $k$ thereon forces the pawl $g$ inward until it is caught and held by its spring-latch, and the bevel-wheel B is released from the shaft and allowed to rotate freely thereon.

The wheel B' has a similar arrangement of pawl, latch, cam-block, and devices for actuating the same, and said block being moved outward, the pawl is released from the retaining-latch and the wheel B' is engaged to the main engine-shaft for driving the axle, reversing its movement, the wheel B meanwhile rotating loosely on the shaft. The levers $n\ n'$, for actuating these cam-blocks or moving them outward against the tension of the springs described, may be held in any desired position by means of notched rack-bars or any suitable devices for that purpose.

A similar arrangement of pawl-carriers and of pawls and spring-latches to that above described is provided at each end of the main axle E, for connecting the traction-wheels with said axle, and these are provided, also, with cam-blocks connected, through crank-shafts, with rods P, extending forward to within convenient reach of the driver, who, through said arrangement, can throw either or both of the traction-wheels into or out of engagement with the rotating axle, as may be required. Thus the driver is enabled to control the movements of the engine, moving it forward or backward, turning it by rotating only one of its traction-wheels, and that in either direction, or throwing it out of gear at will, and all without leaving his seat on the machine.

Having now described my invention, I claim—

1. The bevel-wheels on the engine-shaft, provided with the notched or recessed hubs, in combination with the disks or pawl-carriers, and the pawls arranged and operating in connection therewith, substantially as described, for engaging the bevel-wheels with the engine-shaft.

2. The pawl-carrier provided with the spring-pawl and retaining-latch, in combination with the cam-block for actuating said pawl and latch and engaging the gear or traction wheel with or disconnecting it from its shaft or axle, substantially as described.

3. The combination, with the pawl-carrier provided with the spring-pawl and its retaining-latch, of the movable cam-block or shoe, and the slide and lever or equivalent devices for actuating said cam-block, substantially as described.

PERSIFER T. KISSANE.

Witnesses:
HENRY D. CULLER,
HUNTINGTON BROWN.